United States Patent
Xu et al.

(10) Patent No.: US 11,667,860 B2
(45) Date of Patent: Jun. 6, 2023

(54) PARAFFIN INHIBITOR/PPD PRODUCTS WITH VINYL ACETATE-ALKYL ACRYLATE/METHACRYLATE COPOLYMERS COMBINED WITH ETHYLENE-BASED COPOLYMERS

(71) Applicant: Baker Hughes Oilfield Operations LLC, Houston, TX (US)

(72) Inventors: Kui Xu, Sugar Land, TX (US); Wojciech Jakubowski, Sugar Land, TX (US); David W. Jennings, Houston, TX (US); Rebecca Vilain, Sugar Land, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/352,328

(22) Filed: Jun. 20, 2021

(65) Prior Publication Data

US 2022/0403271 A1    Dec. 22, 2022

(51) Int. Cl.
| | | |
|---|---|---|
| *C10L 1/196* | (2006.01) | |
| *C08L 33/08* | (2006.01) | |
| *C10L 10/04* | (2006.01) | |
| *C10L 10/16* | (2006.01) | |

(52) U.S. Cl.
CPC ............ *C10L 1/1963* (2013.01); *C08L 33/08* (2013.01); *C10L 10/04* (2013.01); *C10L 10/16* (2013.01)

(58) Field of Classification Search
CPC ........ C10L 1/1963; C10L 10/04; C10L 10/16; C08L 33/08
See application file for complete search history.

(56) References Cited

U.S. PATENT DOCUMENTS

| | | | | |
|---|---|---|---|---|
| 4,153,423 A | * | 5/1979 | Wisotsky | ............... C10L 1/146 44/397 |
| 2013/0239465 A1 | * | 9/2013 | Morgan | .................. C10L 1/192 585/10 |

FOREIGN PATENT DOCUMENTS

JP    2008184494 A  *  8/2008

* cited by examiner

*Primary Examiner* — Taiwo Oladapo
(74) *Attorney, Agent, or Firm* — Crowe & Dunlevy, P.C.

(57) ABSTRACT

A stabilized paraffin inhibitor/pour point depressant (PI/PPD) product formulation is described which includes a copolymer having a monomer selected from the group consisting of alkyl acrylate polymers, alkyl methacrylate polymers, and combinations thereof, where the copolymer comprises vinyl acetate and the product includes an ethylene-based copolymer. The presence of the vinyl acetate stabilizes the product to prevent or inhibit the ethylene-based copolymer from separating out of the product. The product is useful to reduce paraffin deposition and/or improve flow characteristics of petroleum fluids, such as crude oil.

17 Claims, 1 Drawing Sheet

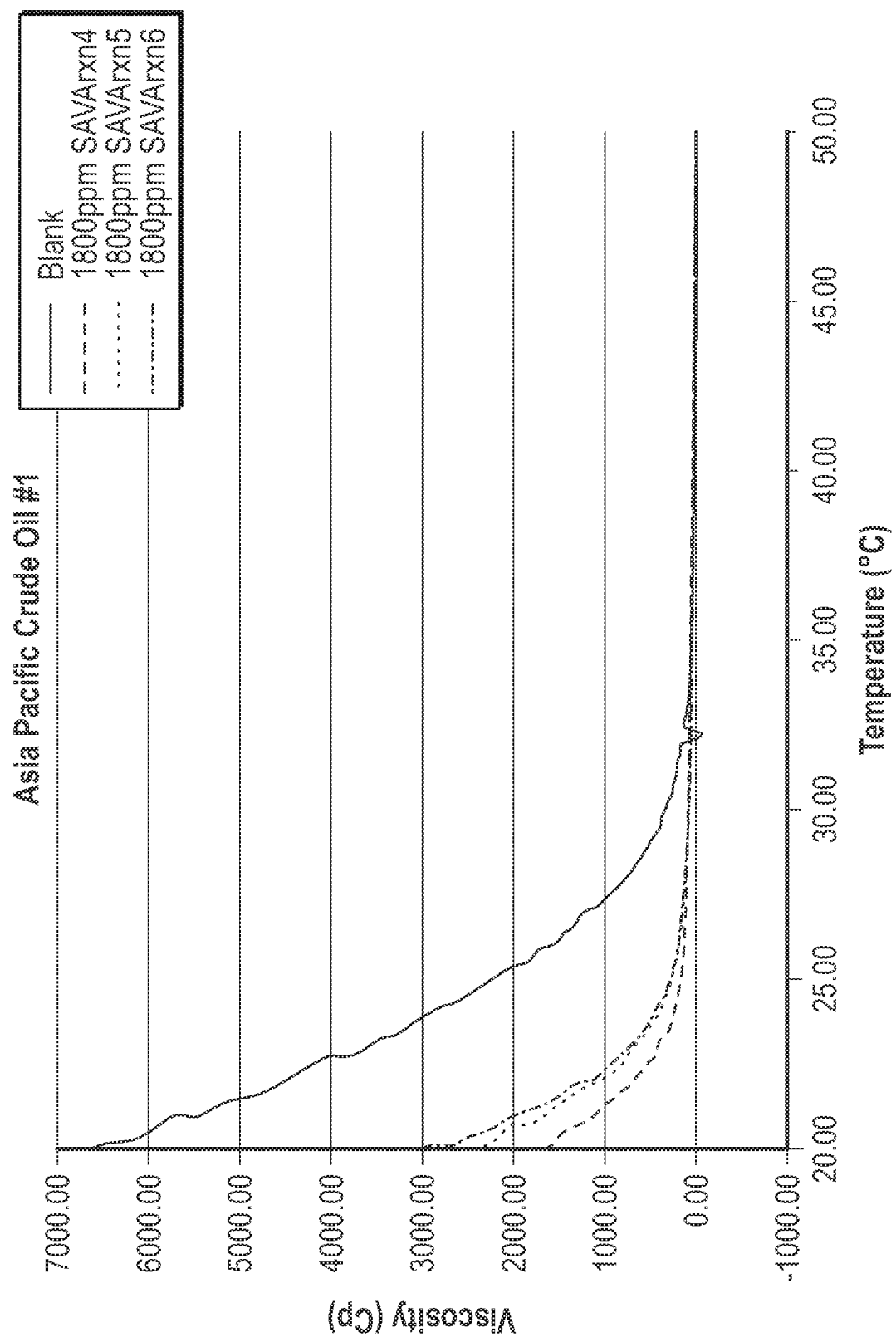

PARAFFIN INHIBITOR/PPD PRODUCTS WITH VINYL ACETATE-ALKYL ACRYLATE/METHACRYLATE COPOLYMERS COMBINED WITH ETHYLENE-BASED COPOLYMERS

TECHNICAL FIELD

The present invention relates to products that function as paraffin inhibitors and/or pour point depressants, and more particularly relates to improved products that function as paraffin inhibitors and/or pour point depressants which include ethylene-based copolymers. The products are improved with respect to providing more stable product formulations that overcome instability issues present in many product formulations that include ethylene-based copolymers. These instability issues cause problems in handling and injecting the products in field applications thereby preventing or seriously limiting their use.

BACKGROUND

Paraffin inhibitors are chemicals used in the production, transportation, and storage of crude oil and other petroleum fluids. Paraffin inhibitors are used to prevent or minimize the deposition of naturally-occurring paraffins (wax) and/or to improve flow characteristics of waxy crude oils and petroleum fluids. When the paraffin inhibitor (PI) is used to improve the flow characteristics, it is commonly referred to as a pour point depressant (PPD). During production, high-wax crude oils are prone to become very viscous or even gel solid from wax precipitation as fluids cool. In some waxy crude oils, PI/PPDs can significantly reduce the viscosity and temperature that the crude oil/petroleum gels solid. Similarly, paraffin inhibitors applied to treat wax deposition have provided significant reduction in deposition in many applications.

The "pour point" is a measurement of crude oil/petroleum fluidity. It is the temperature at which a petroleum fluid last flows in a specific standard test procedure. One test procedure to determine the pour point is the ASTM D-97 pour point test where the temperature that petroleum ceases to flow when the sample is held at 90 degrees to the upright for five seconds is determined. The pour point is then defined as 3° C. higher than the gel point temperature when turned 90 degrees. Higher pour points are typically associated with crude oils/petroleum having significant paraffin or wax content because these fouling components begin precipitating as the temperature of the fluid decreases. At some point, the crystal precipitation may grow, accumulate, and/or agglomerate to the point where the fluid will no longer flow.

PI/PPDs are applied globally and provide a considerable impact on many production systems. The operations which rely the most on PI/PPD treatment are operations which deal with high-wax content fluids and/or operate in cold environments. Cold environments which are problematic include deepwater subsea operations (about 4° C.) and winter-time operations (10 to −50° C.) especially in far northern/southern regions such as Canada, Russia, Argentina, etc. For some operations, paraffin inhibitors are critical to the field's operation and economics. It is not uncommon to encounter crude oils that cause severe paraffin deposition or have pour points significantly above normal operation temperatures. High wax and high pour point crude oils provide significant challenges to produce because of the potential to cause problems over the whole range of the production and transportation system: near wellbore, wells, flowlines, processing equipment, export lines, and tanker transportation.

PI/PPD chemistries are generally polymers in which the polymer structure contains wax-like portions that allow the molecules to incorporate into wax crystal growth, yet also has other structural features which alter and disrupt the crystallization/crystal network growth. When effectively incorporated into a paraffin crystal network, the net result is a reduction in deposition, viscosity, or gel point. Due to the mechanism on how paraffin inhibitors function, paraffin inhibitors are also called wax crystal modifiers. How well the paraffin inhibitor functions depends on the inhibitor chemistry and its product formulation, the crude oil/petroleum chemistry, and conditions present in the production system. Because each crude oil/petroleum is unique, it is important to select the correct inhibitor for an application to get optimal performance. In addition, the paraffin inhibitor formulation must meet the appropriate product specs to be applied/injected for an application. Often it is required the paraffin inhibitor product be liquid with specified maximum viscosity at the operation's temperatures in order to be injected with standard chemical injection pumps. Most often the paraffin inhibitor polymer(s) is/are formulated in a solvent to meet the pump injection requirements. Being able to meet product formulation specs and not have any instability issues which could overtime interfere with injecting the product are of equal importance to the product performance in reducing deposition, viscosity, or pour point else the product cannot be used.

In addition to being important for the production and transportation of crude oils and condensates in upstream operations, PI/PPDs are important for other petroleum fluids. Refined petroleum fluids such as fuel oil, lubricants, diesel, and jet fuels contain paraffins, waxes, etc. that may precipitate, gel fluids, and agglomerate, particularly at low temperatures because of the fouling paraffin components within the fluid. "Fouling component" is defined herein to be any component that may agglomerate or precipitate in a fluid.

As the temperature of the fluid falls and approaches the pour point, difficulties arise in transporting the fuel or lubricant through lines and pumps. Further, the wax crystals tend to plug fuel lines, screens, and filters at temperatures above the pour point. These problems are well recognized in the art, and various PPDs are commercially used for depressing the pour point of fuel oils and lubricants. Similarly, PI/PPD additives are commercially used for reducing the size and changing the shape of the wax crystals that do form. Smaller size crystals are desirable since they are less likely to clog a filter, but these smaller crystals may still agglomerate and form larger crystals and subsequently pose the same problem of plugging or clogging various types of well equipment. Thus, it would be beneficial to also prevent the smaller crystals from agglomerating and/or precipitating, or otherwise accumulating.

PI/PPD treatments are applied in many locations ranging from injection downhole into wells, wellheads, flowlines, surface and processing facilities, transportation vessels, refineries, and storage tanks. They are also sometimes even pumped or squeezed into reservoirs and added into fuel and lubricant packages. It is optimal to inject into the crude oil or petroleum prior to paraffin precipitation and the occurrence of deleterious effects from the paraffin (deposition, gelling, plugging, etc.). Injection into crude oil and petroleum after the paraffin precipitation starts can still provide performance, but it may be less effective.

Products are known which can function both as paraffin inhibitors (PI) and pour point depressants (PPD), depending upon the application. Optimal PI/PPD performance can often be obtained by using a combination of chemistries. One commonly used chemistry class that is often combined with other chemistry classes to provide improved performance is ethylene vinyl acetate (EVA) polymers. However, it is known that EVA chemistries can be incompatible when mixed with PI/PPD polymers of other chemistry classes including alkyl acrylates/methacrylates in various product formulations. This incompatibility can result in the EVA separating in the product formulation. The separated non-homogeneous product is very often not suitable to provide desired performance or is causing plugging problems during application and pumping. It is thus desirable to improve the stability of PI/PPD products that contain EVA.

SUMMARY

There is provided, in one form, a method for reducing paraffin deposition and/or improving flow characteristics of a petroleum fluid, where the method includes introducing into the petroleum fluid which contains a fouling component (e.g. paraffin, wax, and combinations thereof) a paraffin inhibitor/pour point depressant (PI/PPD) product formulation in an amount effective to thereby at least partially prevent deposition of the fouling component from the petroleum fluid and/or improve flow characteristics of the petroleum fluid, where the PI/PPD product formulation comprises a first copolymer having a monomer selected from the group consisting of alkyl acrylate, alkyl methacrylate, and combinations thereof, and where the first copolymer comprises vinyl acetate, and an ethylene-based copolymer that is a copolymer of ethylene with a co-monomer, where the co-monomer is selected from the group consisting of vinyl acetate, vinyl butyrate, methyl acrylate, ethyl acrylate, propyl acrylate, butyl acrylate, methyl methacrylate, ethyl methacrylate, propyl methacrylate, butyl methacrylate, acrylic acid, maleic anhydride, glycidyl acrylate, glycidyl methacrylate, vinyl alcohol, vinyl chloride and combinations thereof. Optionally, the first copolymer is made by polymerizing alkyl acrylate and/or alkyl methacrylate with vinyl acetate in the presence of the ethylene-based copolymer.

There is further provided in another non-limiting form, a stabilized paraffin inhibitor/pour point depressant (PI/PPD) product formulation which includes an ethylene-based copolymer and a first copolymer comprising a monomer selected from the group consisting of alkyl acrylate, alkyl methacrylate, and combinations thereof, where the first copolymer comprises vinyl acetate, and where the ethylene-based copolymer comprises a copolymer of ethylene with a comonomer, where the co-monomer is selected from the group consisting of vinyl acetate, vinyl butyrate, methyl acrylate, ethyl acrylate, propyl acrylate, butyl acrylate, methyl methacrylate, ethyl methacrylate, propyl methacrylate, butyl methacrylate, acrylic acid, maleic anhydride, glycidyl acrylate, glycidyl methacrylate, vinyl alcohol, vinyl chloride and combinations thereof.

Additionally there is provided a treated petroleum fluid that includes a petroleum fluid; a fouling component selected from the group consisting of paraffin, wax, and combinations thereof; and a PI/PPD product formulation in an amount effective to thereby at least partially prevent deposition of the fouling component from the petroleum fluid and/or improve flow characteristics of the petroleum fluid, where the PI/PPD product formulation comprises a first copolymer having a monomer selected from the group consisting of alkyl acrylate, alkyl methacrylate, and combinations thereof, and where the first copolymer comprises vinyl acetate, and an ethylene-based copolymer that is a copolymer of ethylene with a co-monomer, where the co-monomer is selected from the group consisting of vinyl acetate, vinyl butyrate, methyl acrylate, ethyl acrylate, propyl acrylate, butyl acrylate, methyl methacrylate, ethyl methacrylate, propyl methacrylate, butyl methacrylate, acrylic acid, maleic anhydride, glycidyl acrylate, glycidyl methacrylate, vinyl alcohol, vinyl chloride and combinations thereof. Again, optionally the first copolymer is made by polymerizing alkyl acrylate and/or alkyl methacrylate with vinyl acetate in the presence of the ethylene-based copolymer.

BRIEF DESCRIPTION OF THE DRAWING

The FIGURE is a chart of viscosity of Asia Pacific Crude Oil #1 as a function of temperature showing the results of a blank untreated Crude Oil #1 and Crude Oil #1 treated with different PPDs containing a stearyl acrylate vinyl acetate copolymer with different EVAs included.

DETAILED DESCRIPTION

As previously mentioned, paraffin inhibitors are products used to reduce paraffin deposition or improve flow characteristics of high-wax content hydrocarbon fluids, such as crude oils. When used to improve flow characteristics, the paraffin inhibitor (PI) is commonly called a pour point depressant (PPD). PI/PPD formulations include waxy-type polymers designed to interact with the wax/paraffin in crude oils. Optimal PI/PPD performance is sometimes obtained by using a combination of chemistries, but ethylene-based copolymer chemistries can be incompatible in formulations with PI/PPD polymers of other chemistry classes including alkyl acrylates and alkyl methacrylates. It has been discovered that the incorporation of vinyl acetate into these polymers stabilizes EVA (as one non-restrictive example of an ethylene-based copolymer) in the product formulations. More specifically, the use of vinyl acetate-alkyl acrylate co-polymers or vinyl acetate-alkyl methacrylate copolymers or vinyl acetate-alkyl acrylate-alkyl methacrylate co-polymers avoids instability with EVA that is seen in using alkyl acrylate/methacrylate homopolymers and other co-polymers of the same without vinyl acetate present. Addition of relatively small amounts of vinyl acetate into the acrylate/methacrylate copolymer (first copolymer) has been found to keep EVA from separating yet maintaining good PI/PPD performance providing improved alkyl acrylate/methacrylate-EVA combination product formulations suitable for paraffin inhibition applications and/or pour point depression applications.

In particular, incorporation of small or moderate amounts of vinyl acetate monomer into the alkyl acrylate/alkyl methacrylate polymer backbone has been discovered to overcome the stability problems seen in formulations of alkyl acrylate/alkyl methacrylate polymers with EVA and other ethylene-based copolymers. To date, incorporation of other monomers into the alkyl acrylate/alkyl methacrylate polymer backbone has been found not to provide stability.

Surprisingly, it appears that it can be helpful that the ethylene-based copolymer be present in the reaction to form the acrylate-vinyl acetate or methacrylate-vinyl acetate copolymer. In one non-limiting embodiment, there may be some grafting or entanglement occurring with the ethylene-based copolymer and the resulting alkyl acrylate/alkyl methacrylate vinyl acetate copolymers. In contrast, some stability tests with just the EVA blended in after the reactions were performed and the resulting product formulations were not stable.

Non-limiting examples of the co-monomer useful to be copolymerized with ethylene to give the ethylene-based copolymers include, but are not necessarily limited to, vinyl acetate, vinyl butyrate, methyl acrylate, ethyl acrylate, propyl acrylate, butyl acrylate, methyl methacrylate, ethyl methacrylate, propyl methacrylate, butyl methacrylate, acrylic acid, maleic anhydride, glycidyl acrylate, glycidyl methacrylate, vinyl alcohol, vinyl chloride and combinations thereof. In one non-restrictive version, the co-monomer is vinyl acetate and the ethylene-based copolymer is EVA.

Polymerizing these monomers together is known to those skilled in the polymerization art.

In one non-limiting embodiment the amount of vinyl acetate in the alkyl acrylate/alkyl methacrylate vinyl acetate copolymers ranges from about 2 independently to about 45 wt %, based on the total resulting first copolymer; in another non-restrictive version from about 5 independently to about 35 wt % alternatively from about 10 independently to about 25 wt %. As used herein with respect to a range, "independently" means that any endpoint stated may be used together with any other endpoint stated to give an acceptable alternative range; in a non-limiting example, from about 2 to about 10 wt %.

Suitable alkyl acrylate and alkyl methacrylate monomers for the first copolymers described herein have alkyl chain lengths ranging from $C_{12}$ independently to $C_{50}$; alternatively ranging from $C_{16}$ independently to $C_{40}$.

In the PI/PPD product formulations, the amount of ethylene-based copolymer present ranges from about 0.25 independently to about 20 wt %, independently from about 0.5 wt % independently to about 10 wt %; and in another non-limiting version the amount of ethylene-based copolymer together with the first copolymer ranges from about 2 wt % independently to about 70 wt %.

As previously discussed, in one non-limiting embodiment, the vinyl acetate may advantageously be copolymerized with the alkyl acrylate and/or alkyl methacrylate with an ethylene-based copolymer present to give the PI/PPD product formulation.

Interestingly, it was discovered that incorporating different monomers besides vinyl acetate into copolymers with alkyl acrylate/alkyl methacrylate do not give the stabilizing effect. In particular, it was discovered that neither butyl acrylate nor vinyl pyrrolidone gave the stabilizing effect.

In another non-limiting embodiment, the amount of PI/PPD in the petroleum fluid ranges from about 50 independently to about 20,000 ppm, based on the petroleum fluid; alternatively from about 75 independently to about 10,000 ppm.

It should be understood that in the context of the methods and polymer product formulations described herein that the treated "petroleum fluids" include, but are not necessarily limited to, crude oil, condensate, petroleum, diesel, fuel oil, kerosene, jet fuel, mineral oils, and the like.

The invention will be further described with respect to the following Examples, which are not meant to limit the invention, but rather to further illustrate some embodiments.

EXAMPLES

In the following examples, unless otherwise listed, the EVA in the product formulations was included and present before and during the polymerization reaction of the acrylate/methacrylate polymers.

Examples 1 and 2: Examples of Instability Problems

Blends:

Example 1: Example of instability problem with blending EVA with acrylate homopolymers. In this example the EVA was not added before or during the polymerization of the other polymers. It was blended with a previously synthesized and completely formed acrylate/methacrylate polymer. It should be noted that problems occurs over a wide range of polymer solution compositions. Example with SA1 (stearyl acrylate homopolymer) and EVA1 (EVA with 28 wt. % vinyl acetate composition and melt index of 41) formulated in xylene. Different composition ranges from 30 to 16 wt. % SA1 and 4 to 0.5 wt. % EVA1. The results are shown in Table I.

TABLE I

Example 1 Results

| Blend Description (Wt. % SA1:EVA1) | Initial Observation | Observation after 3 days - room temp. (~21° C.) | Observation after additional ~16 hrs overnight at 40° C. |
|---|---|---|---|
| SA1 + EVA1 (30%:4%) | hazy | hazy; material sticking to glass | 3 phases |
| SA1 + EVA1 (30%:2%) | hazy | hazy | 3 phases |
| SA1 + EVA1 (25%:4%) | hazy | 2 phases | 2 phases |
| SA1 + EVA1 (25%:2%) | hazy | 2 phases | 2 phases |
| SA1 + EVA1 (25%:1%) | clear | Hazy | 2 phases |
| SA1 + EVA1 (25%:0.5%) | clear | Hazy | 3 phases |
| SA1 + EVA1 (20%:4%) | clear | 2 phases | 3 phases |
| SA1 + EVA1 (20%:2%) | clear | 2 phases | 3 phases |
| SA1 + EVA1 (20%:1%) | clear | 2 phases | 3 phases |
| SA1 + EVA1 (20%:0.5%) | clear | 2 phases | 2 phases |
| SA1 + EVA1 (18%:4%) | slightly hazy | 2 phases | 3 phases |
| SA1 + EVA1 (16%:4%) | clear | 2 phases | 3 phases |

"2 phases" refers to two distinct, separated liquid phases. "3 phases" refers to two distinct, separated liquid phases plus solid polymer; usually adhered to the glass bottle holding the polymer solution.

Example 2: Example of instability problem with blending EVA with acrylate homopolymer. In this example the EVA was not added before or during the polymerization of the other acrylate/methacrylate polymers. It was blended with a previously synthesized and completely formed acrylate/methacrylate polymer. Problems occurred with all EVAs tested. In this example SA1 (stearyl acrylate homopolymer) was blended in xylene with 5 different EVAs at 25 wt. % SA1 acrylate and 3 wt. % EVA. Melt Indices are given; melt index is related to molecular weight. The results are presented in Table II.

EVA2: 28 wt % vinyl acetate, Melt Index=6
EVA3: 28 wt % vinyl acetate, Melt Index=42
EVA4: 28 wt % vinyl acetate, Melt Index=400
EVA1: 28 wt % vinyl acetate, Melt Index=41
EVA5: 33 wt % vinyl acetate, Melt Index=21

TABLE II

Example 4 Results

| Blend Description (Wt. % SA1:EVA) | Initial Observation | Observation after ~3 days- Room Temperature (~21° C.) | Observation after additional ~16 hrs overnight at 40° C. |
|---|---|---|---|
| SA1 + EVA2 (25%:3%) | hazy | 2 phases; one gelled | 3 phases |
| SA1 + EVA3 (25%:3%) | hazy | 2 phases | 3 phases |
| SA1 + EVA4 (25%:3%) | hazy | 2 phases | 3 phases |
| SA1 + EVA1 (25%:3%) | hazy | 2 phases; one gelled | 3 phases |
| SA1 + EVA5 (25%:3%) | hazy | 2 phases | 2 phases |

Examples 3-5: Examples of Improved Stability

Example 3: Example of instability problem with blending EVA with acrylate homopolymer and acrylate/methacrylate co-polymers. EVA1 (EVA with 28 wt. % vinyl acetate composition and melt index of 41) is used in all blends. The acrylate homopolymer and acrylate/methacrylate co-polymers used in the blends are:

SA1=stearyl acrylate homopolymer
SABuA1=95.8: 4.2 wt. ratio % stearyl acrylate-butyl acrylate copolymer
SAVA1=88.7: 11.3 wt. ratio stearyl acrylate-vinyl acetate copolymer
SASMA1=74.4: 25.6 wt. ratio stearyl acrylate-stearyl methacrylate copolymer
SAVArxn1=89.0: 11.0 wt. ratio stearyl acrylate-vinyl acetate copolymer with EVA5 added before reaction. Product formulation: 23.5 wt. % stearyl acrylate-vinyl acetate copolymer, 1.4 wt. % EVA5, and 75.1 wt. % xylene.

In this example the EVA was not added before or during the polymerization of the other polymers except for SAVArxn1. Except for SAVArxn1, EVA was blended with a previously synthesized and completely formed acrylate/methacrylate polymer.

Note that in contrast to other blends, SAVArxn1 the acrylate vinyl acetate co-polymer with EVA5 added before the acrylate co-polymerization reaction is stable. Stable as defined herein means not having any macroscopic separation, in one non-limiting embodiment. The results are presented in Table III.

TABLE III

Example 3 Results

| Blend Description (Wt. % Acrylate polymer:EVA) | Initial Observation | Observation after ~3 days - Room Temp. (~21° C.) | Observation after additional ~16 hrs overnight at 40° C. |
|---|---|---|---|
| SA1 + EVA1 (25%:3%) | Hazy | 2 phases; one gelled | 3 phases |
| SABuAl + EVA1 (25%:3%) | Hazy | hazy; a lot of material sticking to glass | 2 phases |
| SAVA1 + EVA1 (25%:3%) | Hazy | N/A | 2 phases |
| SASMA1 + EVA1 (25%:3%) | slightly hazy | N/A | 2 phases |
| SAVArxn1(23.5%:1.4%) | slightly hazy | slightly hazy | slightly hazy not separated |

Example 4: Example of stability in alkyl acrylate vinyl acetate co-polymers containing EVA present during the reactions.

This example contrasts the stability of the acrylate vinyl acetate co-polymers containing EVA present during the reactions to acrylate polymers without vinyl acetate. EVA5 was present during the polymerization reaction in all samples in this example. The samples in the example are:

SABuAraxn1=95.8: 4.2 wt. ratio stearyl acrylate-butyl acrylate copolymer with EVA5 added before reaction. Product formulation: 23.5 wt. % stearyl acrylate-butyl acrylate copolymer, 1.4 wt. % EVA5, and 75.1 wt. % xylene.

SAVArxn1=89.0: 11.0 wt. ratio stearyl acrylate-vinyl acetate copolymer with EVA5 added before reaction. Product formulation: 23.5 wt. % stearyl acrylate-vinyl acetate copolymer, 1.4 wt. % EVA5, and 75.1 wt. % xylene.

SAVArxn2=89.0: 11.0 wt. ratio stearyl acrylate-vinyl acetate copolymer with EVA5 added before reaction. Product formulation: 23.9 wt. % stearyl acrylate-vinyl acetate copolymer, 0.9 wt. % EVA5, and 75.2 wt. % xylene.

The co-polymers with acrylate and vinyl acetate are "macroscopically stable", i.e. they did not separate. The acrylate co-polymer is unstable. Similar behavior has been observed in many other acrylate co-polymers and homopolymers. The results are presented in Table IV.

Stability Testing at 40° C. (A More Stringent Test On Stability than Room Temperature).

TABLE IV

Example 4 Results

| Product | Composition (wt %: acrylate polymer, EVA5, xylene) | Time (Days) | Stability |
|---|---|---|---|
| SABuArxn1 | 23.5, 1.4, 75.1 | 1 | Unstable - separated into 2 phases |
| SAVArxn1 | 23.5, 1.4, 75.1 | 4+ | Hazy no separation |
| SAVArxn2 | 23.9, 0.9, 75.2 | 4+ | Hazy no separation |

Example 5: Example of Stability in Alkyl Acrylate Vinyl Acetate Co-Polymers Containing EVA Present During the Reactions This example contrasts the stability of the acrylate vinyl acetate co-polymers containing EVA present during the reactions to acrylate polymers without vinyl acetate. EVA5 was present during the polymerization reaction in all samples in this example. The samples in the example are:

SAVPrxn1=94.3: 5.7 wt. ratio stearyl acrylate-vinyl pyrrolidone copolymer with EVA5 added before reaction. Product formulation: 23.5 wt. % stearyl acrylate-vinyl pyrrolidone copolymer, 1.4 wt. % EVA5, and 75.1 wt. % xylene.

SAVArxn1=89.0: 11.0 wt. ratio stearyl acrylate-vinyl acetate copolymer with EVA5 added before reaction. Product formulation: 23.5 wt. % stearyl acrylate-vinyl acetate copolymer, 1.4 wt. % EVA5, and 75.1 wt. % xylene.

SAVArxn2=89.0: 11.0 wt. ratio stearyl acrylate-vinyl acetate copolymer with EVA5 added before reaction. Product formulation: 23.9 wt. % stearyl acrylate-vinyl acetate copolymer, 0.9 wt. % EVA5, and 75.2 wt. % xylene.

The co-polymers with acrylate and vinyl acetate are "macroscopically stable", i.e. they did not separate. The acrylate vinyl pyrrolidone co-polymer is unstable. Similar behavior has been observed in many other acrylate co-polymers and homopolymers.

TABLE V

Example 5 Results
Stability Evaluation at Room Temperature

| Product | Composition (wt %: acrylate polymer, EVA5, xylene) | Time (Days) | Stability |
|---|---|---|---|
| SAVPrxn1 | 23.5, 1.4, 75.1 | 1 | Unstable - separated into 2 phases, gelled top phase |
| SAVArxn1 | 23.5, 1.4, 75.1 | 30+ | Hazy no separation |
| SAVArxn2 | 23.9, 0.9, 75.2 | 30+ | Hazy no separation |
| SAVArxn1 | 23.5, 1.4, 75.1 | 180+ | Hazy no separation |
| SAVArxn2 | 23.5, 0.9, 75.2 | 180+ | Hazy no separation |

Examples 6-7: Examples of Products Functioning as Effective PPDs

Examples 6 and 7: Examples of acrylate-vinyl acetate co-polymers with EVA included in during the polymerization reaction showing pour point depressant (PPD) performance. These Examples are included to illustrate the chemistries function as effective PPDs. Note, the performance of the samples illustrated below were not necessarily the best performing samples or better than acrylate EVA chemistries without vinyl acetate, but the samples do not have stability issues which can cause problems with pumping and applying products in the field.

Example 6: African Crude Oil

Relative pour points of samples in bottles were measured in a procedure similar to ASTM D97 minimum pour point. The crude oil samples were heated to about 65° C. and then cooled in a water bath. The samples were checked for ability to flow at every 3° C. starting at a water bath temperature of 30° C. by slightly tilting the samples. The samples were determined to be gelled when they would not flow on being held horizontal for 5 seconds. The pour point was defined as the water bath temperature 3° C. higher than the gelling point temperature. The results are presented in Table VI. The samples in the example are:

SAVArxn3=95.6: 4.4 wt. ratio stearyl acrylate-vinyl acetate copolymer with EVA added before reaction. Product formulation: 29.3 wt. % stearyl acrylate-vinyl acetate copolymer, 0.6 wt. % EVA5, and 70.1 wt. % xylene.
SABAVArxn1=43.3: 46.9: 9.8 wt. ratio stearyl acrylate-behenyl acrylate-vinyl acetate copolymer with EVA5 added before reaction. Product formulation: 28.7 wt. % stearyl acrylate-behenyl acrylate-vinyl acetate copolymer, 1.2 wt. % EVA5, and 70.1 wt. % xylene.
SABAVArxn2=43.3: 46.9: 9.8 wt. ratio stearyl acrylate-behenyl acrylate-vinyl acetate copolymer with EVA5 added before reaction. Product formulation: 29.4 wt. % stearyl acrylate-behenyl acrylate-vinyl acetate copolymer, 0.6 wt. % EVA5, and 70.0 wt. % xylene.

TABLE VI

Example 6 Results

| PPD Product | PPD Dose (ppm) | Pour Point (° C.) |
|---|---|---|
| Untreated crude oil | — | 24 |
| SAVArxn3 | 2500 | 18 |
| SABAVArxn1 | 2500 | 15 |
| SABAVArxn2 | 2500 | 12 |

Example 7

The respective viscosities of crude oils were measured with a Haake rheometer using a parallel plate geometry. After heating and conditioning the samples at about 80° C., the samples were loaded on to the rheometer and cooled at 1° C./min and the viscosity-temperature trace recorded from 80 to 10° C. Below are results for four crude oils. The FIGURE is a chart of viscosity of Asia Pacific Crude Oil #1 as a function of temperature showing the results of a blank and Crude Oil #1 containing a stearyl acrylate vinyl acetate copolymer with different EVAs included from Table VII. The samples in the example are:

SAVArxn4=92.8: 7.2 wt. ratio stearyl acrylate-vinyl acetate copolymer with EVA5 added before reaction. Product formulation: 23.5 wt. % stearyl acrylate-vinyl acetate copolymer, 1.4 wt. % EVA5, and 75.1 wt. % xylene.
SAVArxn5=89.0: 11.0 wt. ratio stearyl acrylate-vinyl acetate copolymer with EVA5 added before reaction. Product formulation: 24.4 wt. % stearyl acrylate-vinyl acetate copolymer, 0.5 wt. % EVA5, and 75.1 wt. % xylene.
SAVArxn1=89.0: 11.0 wt. ratio stearyl acrylate-vinyl acetate copolymer with EVA5 added before reaction. Product formulation: 23.5 wt. % stearyl acrylate-vinyl acetate copolymer, 1.4 wt. % EVA5, and 75.1 wt. % xylene.

TABLE VII

Example 7A - Asia Pacific Region Crude Oil #1

| PPD Chemistry | PPD Dose (ppm) | Viscosity at 25° C. (cP) |
|---|---|---|
| Untreated crude oil | — | 2256 |
| SAVArxn4 | 1800 | 173 |
| SAVArxn5 | 1800 | 291 |
| SAVArxn1 | 1800 | 271 |

TABLE VIII

Example 7B - Asia Pacific Region Crude Oil #2

| PPD Chemistry | PPD Dose (ppm) | Viscosity at 25° C. (cP) |
|---|---|---|
| Untreated crude oil | — | 927 |
| SAVArxn4 | 1800 | 372 |
| SAVArxn5 | 1800 | 277 |
| SAVArxn1 | 1800 | 307 |

TABLE IX

Example 7C - Asia Pacific Region Crude Oil #3

| PPD Chemistry | PPD Dose (ppm) | Viscosity at 25° C. (cP) |
|---|---|---|
| Untreated crude oil | — | 902 |
| SAVArxn4 | 1800 | 139 |
| SAVArxn5 | 1800 | 159 |
| SAVArxn1 | 1800 | 138 |

TABLE X

Example 7D - Asia Pacific Region Crude Oil #4

| PPD Chemistry | PPD Dose (ppm) | Viscosity at 25° C. (cP) |
|---|---|---|
| Untreated crude oil | — | 9265 |
| SAVArxn4 | 1800 | 3845 |
| SAVArxn5 | 1800 | 3984 |
| SAVArxn1 | 1800 | 2816 |

In the foregoing specification, the invention has been described with reference to specific embodiments thereof. However, it will be evident that various modifications and changes can be made thereto without departing from the broader scope of the invention as set forth in the appended claims. Accordingly, the specification is to be regarded in an illustrative rather than a restrictive sense. For example, uses, reactions, monomers, copolymers, ethylene-based copolymers, hydrocarbons, streams, compositions, proportions, and amounts not specifically identified or described in this disclosure or not evaluated in a particular Example are still expected to be within the scope of this invention.

The present invention may suitably comprise, consist or consist essentially of the elements disclosed and may be practiced in the absence of an element not disclosed. For instance, the method for reducing paraffin deposition and/or improving flow characteristics of a petroleum fluid may comprise, consist essentially of, or consist of introducing into the petroleum fluid containing a fouling component selected from the group consisting of paraffin, wax, and combinations thereof, a PI/PPD product formulation in an amount effective to thereby at least partially prevent deposition of the fouling component from the petroleum fluid and/or improve flow characteristics of the petroleum fluid where the PI/PPD product formulation comprises a first copolymer having a monomer selected from the group consisting of alkyl acrylate, alkyl methacrylate, and combinations thereof, where the polymer also comprises, consists essentially of, or consists of vinyl acetate, and an ethylene-based copolymer that is a copolymer of ethylene with a co-monomer, where the co-monomer is selected from the group consisting of vinyl acetate, vinyl butyrate, methyl acrylate, ethyl acrylate, propyl acrylate, butyl acrylate, methyl methacrylate, ethyl methacrylate, propyl methacrylate, butyl methacrylate, acrylic acid, maleic anhydride, glycidyl acrylate, glycidyl methacrylate, vinyl alcohol, vinyl chloride and combinations thereof. Optionally, the first copolymer is made by polymerizing alkyl acrylate and/or alkyl methacrylate with vinyl acetate in the presence of the ethylene-based copolymer.

There may be further provided a stabilized paraffin inhibitor/pour point depressant (PI/PPD) product formulation consisting essentially of or consisting of ethylene-based copolymers and a polymer comprising, consists essentially of, or consists of a monomer selected from the group consisting of alkyl acrylate, alkyl methacrylate, and combinations thereof, where the copolymer also comprises, consists essentially of, or consists of vinyl acetate. The ethylene-based copolymer comprises, consists essentially of, or consists of a copolymer of ethylene with a co-monomer, where the co-monomer is selected from the group consisting of vinyl acetate, vinyl butyrate, methyl acrylate, ethyl acrylate, propyl acrylate, butyl acrylate, methyl methacrylate, ethyl methacrylate, propyl methacrylate, butyl methacrylate, acrylic acid, maleic anhydride, glycidyl acrylate, glycidyl methacrylate, vinyl alcohol, vinyl chloride and combinations thereof.

Additionally there is provided a treated petroleum fluid that consists essentially of or consists of a petroleum fluid, a fouling component selected from the group consisting of paraffin, wax, and combinations thereof, and a PI/PPD product formulation in an amount effective to thereby at least partially prevent deposition of the fouling component from the petroleum fluid and/or improve flow characteristics of the petroleum fluid, where the PI/PPD product formulation comprises, consists essentially of, or consists of a first copolymer having a monomer selected from the group consisting of alkyl acrylate, alkyl methacrylate, and combinations thereof, and where the first copolymer comprises or consists essentially of, vinyl acetate, and an ethylene-based copolymer that is a copolymer of ethylene with a co-monomer, where the co-monomer is selected from the group consisting of vinyl acetate, vinyl butyrate, methyl acrylate, ethyl acrylate, propyl acrylate, butyl acrylate, methyl methacrylate, ethyl methacrylate, propyl methacrylate, butyl methacrylate, acrylic acid, maleic anhydride, glycidyl acrylate, glycidyl methacrylate, vinyl alcohol, vinyl chloride and combinations thereof. Optionally, the first copolymer is made by polymerizing alkyl acrylate and/or alkyl methacrylate with vinyl acetate in the presence of the ethylene-based copolymers.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A method for reducing paraffin deposition and/or depressing pour point of a petroleum fluid, the method comprising:
   introducing into the petroleum fluid containing a fouling component selected from the group consisting of paraffin, wax, and combinations thereof, a paraffin inhibitor/pour point depressant (PI/PPD) product formulation in an amount effective to thereby
   at least partially prevent deposition of the fouling component from the petroleum fluid and/or depress the pour point of the petroleum fluid,
   where the PI/PPD product formulation comprises
      a first copolymer made by polymerizing a monomer selected from the group consisting of alkyl acrylate, alkyl methacrylate, and combinations thereof with vinyl acetate in the presence of an ethylene-based copolymer, and
      the ethylene-based copolymer that is a copolymer of ethylene with a co-monomer, where the co-monomer is selected from the group consisting of vinyl acetate, vinyl butyrate, methyl acrylate, ethyl acrylate, propyl acrylate, butyl acrylate, methyl methacrylate, ethyl methacrylate, propyl methacrylate, butyl methacrylate, acrylic acid, maleic anhydride, glycidyl acrylate, glycidyl methacrylate, vinyl alcohol, vinyl chloride and combinations thereof.

2. The method of claim 1 where the first copolymer contains from about 2 to about 45 wt % of vinyl acetate.

3. The method of claim 1 where the alkyl acrylate and/or alkyl methacrylate of the first copolymer comprises alkyl chain lengths ranging from $C_{12}$ to $C_{50}$.

4. The method of claim 1 where the amount of ethylene-based copolymer together with the first copolymer ranges from about 2 wt % to about 70 wt % in the PI/PPD product formulation.

5. The method of claim 1 where stability of the PI/PPD product formulation is improved whereby more ethylene-based copolymer remains stabilized in the PI/PPD product formulation as compared to an otherwise identical product PI/PPD formulation absent the vinyl acetate.

6. The method of claim 1 where the amount of inhibitor ranges from about 50 to about 20,000 ppm, based on the petroleum fluid.

7. A stabilized paraffin inhibitor/pour point depressant (PI/PPD) product formulation comprising:
   a first copolymer made by polymerizing a monomer selected from the group consisting of alkyl acrylate, alkyl methacrylate, and combinations thereof with vinyl acetate in the presence of an ethylene-based copolymer; and
   the ethylene-based copolymer that is a copolymer of ethylene with the co-monomer, where the co-monomer is selected from the group consisting of vinyl acetate, vinyl butyrate, methyl acrylate, ethyl acrylate, propyl acrylate, butyl acrylate, methyl methacrylate, ethyl methacrylate, propyl methacrylate, butyl methacrylate, acrylic acid, maleic anhydride, glycidyl acrylate, glycidyl methacrylate, vinyl alcohol, vinyl chloride and combinations thereof.

8. The stabilized PI/PPD product formulation of claim 7 where the first copolymer contains from about 2 to about 45 wt % of vinyl acetate.

9. The stabilized PI/PPD product formulation of claim 7 where the alkyl acrylate and/or alkyl methacrylate of the first copolymer comprises alkyl chain lengths ranging from $C_{12}$ to $C_{50}$.

10. The stabilized PI/PPD product formulation of claim 7 where the amount of ethylene-based copolymer present ranges from about 0.25 wt % to about 20 wt %.

11. The stabilized PI/PPD product formulation of claim 7 where stability of the PI/PPD product formulation is improved whereby more ethylene-based copolymer remains stabilized in the PI/PPD product formulation as compared to an otherwise identical PI/PPD product formulation absent the vinyl acetate.

12. A treated petroleum fluid comprising:
   a petroleum fluid;
   a fouling component selected from the group consisting of paraffin, wax, and combinations thereof; and
   a paraffin inhibitor/pour point depressant (PI/PPD) product formulation in an amount effective to thereby at least partially prevent deposition of the fouling component from the petroleum fluid and/or depress the pour point of the petroleum fluid, where the polymer product formulation comprises
      a first copolymer made by polymerizing a monomer selected from the group consisting of alkyl acrylate, alkyl methacrylate, and combinations thereof with vinyl acetate in the presence of an ethylene-based copolymer, and
      the ethylene-based copolymer that is a copolymer of ethylene with a co-monomer, where the co-monomer is selected from the group consisting of vinyl acetate, vinyl butyrate, methyl acrylate, ethyl acrylate, propyl acrylate, butyl acrylate, methyl methacrylate, ethyl methacrylate, propyl methacrylate, butyl methacrylate, acrylic acid, maleic anhydride, glycidyl acrylate, glycidyl methacrylate, vinyl alcohol, vinyl chloride and combinations thereof.

13. The treated petroleum fluid of claim 12 where the first copolymer contains from about 2 to about 45 wt % of vinyl acetate.

14. The treated petroleum fluid of claim 12 where the alkyl acrylate and/or alkyl methacrylate of the first copolymer comprises alkyl chain lengths ranging from $C_{12}$ to $C_{50}$.

15. The treated petroleum fluid of claim 14 where the amount of ethylene-based copolymer together with the first copolymer ranges from about 2 wt % to about 70 wt % in the PI/PPD product formulation.

16. The treated petroleum fluid of claim 14 where stability of the inhibitor is improved whereby more ethylene-based copolymer remains stabilized in the PI/PPD product formulation as compared to an otherwise identical PI/PPD product formulation absent the vinyl acetate.

17. The treated petroleum fluid of claim 12 where the amount of inhibitor ranges from about 50 to about 20,000 ppm, based on the petroleum fluid.

* * * * *